(12) United States Patent
Narita

(10) Patent No.: US 6,727,905 B1
(45) Date of Patent: Apr. 27, 2004

(54) IMAGE DATA PROCESSING APPARATUS

(75) Inventor: Atsushi Narita, Tokyo (JP)

(73) Assignee: Sony Corporation, Tokyo (JP)

( * ) Notice: Subject to any disclaimer, the term of this patent is extended or adjusted under 35 U.S.C. 154(b) by 467 days.

(21) Appl. No.: 09/638,218

(22) Filed: Aug. 14, 2000

(30) Foreign Application Priority Data

Aug. 16, 1999 (JP) .......................................... P11-229848

(51) Int. Cl.[7] .............................................. G06F 12/06
(52) U.S. Cl. ...................... 345/574; 345/573; 345/564; 711/202
(58) Field of Search ................................ 345/572–574, 345/564, 592, 531–532, 561, 589, 629, 656, 667, 682; 711/202–209

(56) References Cited

U.S. PATENT DOCUMENTS

| 5,231,385 | A | * | 7/1993 | Gengler et al. |
| 5,315,700 | A | * | 5/1994 | Johnston et al. |
| 5,444,497 | A | * | 8/1995 | Takeuchi |
| 5,794,016 | A | * | 8/1998 | Kelleher |
| 5,815,168 | A | * | 9/1998 | May |
| 6,172,687 | B1 | * | 1/2001 | Kitamura et al. |

* cited by examiner

Primary Examiner—Matthew C. Bella
Assistant Examiner—Hau Nguyen
(74) Attorney, Agent, or Firm—Fulwider Patton Lee & Utecht, LLP

(57) ABSTRACT

An image data processing apparatus capable of performing processing at a high speed comprising a DRAM for storing display data including a plurality of first pixel data respectively indicating colors of a plurality of pixels arranged in a matrix and able to be simultaneously written with a plurality of first pixel data. Memory controllers are provided with a plurality of pixel data generation circuits provided corresponding to the plurality of first pixel data to be simultaneously written for performing color blending using the second pixel data and the third pixel data for blending a color indicated by corresponding second pixel data and a color indicated by third pixel data stored in the write address by a predetermined blending ratio to generate a new color so as to generate the first pixel data indicating the new color.

12 Claims, 9 Drawing Sheets

IMAGE DATA PROCESSING APPARATUS

BACKGROUND OF THE INVENTION

1. Field of the Invention

The present invention relates to an image data processing apparatus, more particularly relates to an image data processing apparatus characterized by an address generation circuit and an α-blending circuit.

2. Description of the Related Art

Computer graphics are often used in a variety of computer aided design (CAD) systems and amusement machines. Especially, along with the recent advances in image data processing techniques, systems using three-dimensional computer graphics are becoming rapidly widespread.

In three-dimensional computer graphics, the color value of each pixel is calculated at the time of deciding the color of each corresponding pixel, then pixel data indicating the calculated color is generated and α-blending is performed by using the pixel data. Then, rendering is performed for writing the calculated value of the pixel to an address of a display buffer (frame buffer) corresponding to the pixel.

In the above three-dimensional computer graphics, there are demands for improving the processing speed of the system as a whole by making the α-blending and address generation faster.

SUMMARY OF THE INVENTION

An object of the present invention is to provide an image data processing apparatus capable of attaining high speed processing.

To solve the problems of the above related art and to attain the above object, according to a first aspect of the present invention, there is provided an image data processing apparatus, comprising a storage circuit having a plurality of storage areas able to be simultaneously written with a plurality of pixel data and storing a plurality of pixel data indicating colors of a plurality of pixels arranged in a matrix; a plurality of address generation circuits provided corresponding to the plurality of pixel data simultaneously written to the storage areas and generating write addresses as addresses in the storage areas of the storage circuit for writing corresponding pixel data; and a write circuit for writing a plurality of pixel data to the write addresses in the storage areas.

In the image data processing apparatus according to the first aspect of the present invention, the plurality of address generation circuits provided corresponding to the plurality of pixel data to be simultaneously written in the storage circuit generate write addresses, that is, addresses in a storage area of a storage circuit for writing the corresponding pixel data.

The write circuit simultaneously writes the plurality of pixel data at the write address of the storage area of the storage circuit generated in the address generation circuit.

Preferably, the pixel data includes color data indicating the color and a first position data and a second position data respectively indicating a two-dimensional position of a corresponding pixel in the x-direction and y-direction; and the address generation circuit comprises a multiplying circuit for multiplying the second position data with a width data in accordance with a width of the storage area in the x-direction and an adder circuit for generating the write address by adding the first position data and a multiplied result of the multiplying circuit.

More preferably, the pixel data includes color data indicating the color, a first position data and a second position data respectively indicating a two-dimensional position of a corresponding pixel in the x-direction and y-direction and depth data to be used at the time of performing three-dimensional display processing; and the address generation circuit comprises a first multiplying circuit for multiplying the second position data and width data in accordance with a width of the storage area in the x-direction; a first adding circuit for adding the first position data, a multiplied result of the first multiplying circuit, and a first address data for indicating a head address of a predetermined first storage area for storing color data in the storage area to generate the write address of the color data; a second multiplying circuit for multiplying the second position data and the width data; and a second adding circuit for adding the first position data, a multiplied result of the second multiplying circuit, and a second address data for indicating a head address of a predetermined second storage area for storing depth data in the storage area to generate the write address of the depth data.

Preferably, when automatically generating the circuit pattern of at least part of the circuits based on circuit pattern generation data describing at least part of the circuit functions of the image data processing apparatus using a hardware description language, the functions of the multiplying circuit and the adding circuit are written in the same macro cell in the circuit pattern generation data.

According to a second aspect of the invention, there is provided an image data processing apparatus comprising a storage circuit having a plurality of storage areas able to be simultaneously written with the plurality of first pixel data and storing a plurality of first pixel data indicating colors of a plurality of pixels arranged in a matrix; a plurality of pixel data generation circuits provided corresponding to the simultaneously written plurality of first pixel data and each performing color blending using second pixel data and third pixel data for blending a color indicated by the corresponding second pixel data and a color indicated by the third pixel data stored at a write address by a predetermined blending ratio to generate a new color so as to generate first pixel data indicating a new color; and a write circuit for simultaneously writing the plurality of the first pixel data generated to the storage areas of the storage circuit.

In the image data processing apparatus according to the second aspect of the present invention, the plurality of address generation circuits provided corresponding to the plurality of first pixel data to be simultaneously written in the storage circuit uses the second pixel data and the third pixel data for color blending to blend a color indicated by the corresponding second pixel data and a color indicated by third pixel data stored at a write address by a predetermined blending ratio to generate a new color and generates first pixel data indicating the new color.

Then, the write circuit simultaneously writes the plurality of the generated first pixel data in a storage area of the storage circuit.

Preferably, the first pixel data, the second pixel data, and the third pixel data include a plurality of colors and indicate colors by combining values indicated by the plurality of color data and each the pixel data generation circuit comprises a plurality of color data generation circuits provided corresponding to the plurality of color data and each performing color blending using the corresponding color data of the second pixel data and the third pixel data for blending a color indicated by the corresponding color data of the corresponding second pixel data and a color indicated by the corresponding color data of the third pixel data stored at the write address by a predetermined blending ratio to generate a new color and thereby generate the corresponding color data of the first pixel data indicating the new color.

More preferably, the pixel data generation circuit comprises a subtracting circuit for subtraction using the corresponding color data of the second pixel data and the corresponding color data of the third pixel data and a multiplying circuit for multiplying a subtracted result of the subtracting circuit with blending ratio data indicating the blending ratio.

Preferably, the pixel data generation circuit further comprises an adding circuit for adding a multiplied result of the multiplying circuit and dither data.

Preferably, when automatically generating the circuit pattern of at least part of the circuits based on circuit pattern generation data describing at least part of the circuit functions of the image data processing apparatus using a hardware description language, the functions of the subtracting circuit and the multiplying circuit of the pixel data generation circuit are written in the same macro cell in the circuit pattern generation data.

Preferably, when automatically generating the circuit pattern of at least part of the circuits based on circuit pattern generation data describing at least part of the circuit functions of the image data processing apparatus using a hardware description language, the functions of the plurality of color data generation circuits are written in the same macro cell in the circuit pattern generation data.

According to a third aspect of the present invention, there is provided an image data processing apparatus for defining a three-dimensional model by combining a plurality of unit graphics and generating pixel data indicating a color for each pixel arranged in a matrix in a display device, comprising a polygon rendering data generation circuit for generating polygon rendering data including R (red), G (green), and B (blue) data for vertexes of the unit graphics; a data interpolation circuit for interpolating the polygon rendering data of vertexes of the unit graphics to generate pixel data of pixel positions inside the unit graphics; a storage circuit having a plurality of storage areas able to be simultaneously written with the R, G, B data of a plurality of the pixel data and storing display data including the R, G, B data of a plurality of the pixel data; a plurality of address generation circuits provided corresponding to the plurality of the pixel data to be simultaneously written to the storage areas and each generating a write address as an address in the storage areas of the storage circuit for being written with the R, G, B data of the corresponding pixel data; and a write circuit for writing the R, G, B data of a plurality of the pixel data to the write addresses in the storage areas.

According to a fourth aspect of the present invention, there is provided an image data processing apparatus for defining a three-dimensional model by combining a plurality of unit graphics and generating pixel data indicating a color for each pixel arranged in a matrix in a display device, comprising a polygon rendering data generation circuit for generating polygon rendering data including R (red), G (green), and B (blue) data of each vertex for vertexes of the unit graphics; a data interpolation circuit for interpolating the polygon rendering data of vertexes of the unit graphics to generate first pixel data of pixel positions inside the unit graphics; a storage circuit having a plurality of storage areas able to be simultaneously written with a plurality of the second pixel data and storing display data including a plurality of second pixel data; pixel data generation circuits provided corresponding to the simultaneously written plurality of the second pixel data and each performing color blending using the first pixel data and the third pixel data for blending a color indicated by the first pixel data and a color indicated by third pixel data stored in a write address by a predetermined blending ratio to generate a new color so as to generate the second pixel data indicating the new color; and a write circuit for simultaneously writing a plurality of the generated second pixel data to the storage areas of the storage circuit.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, preferred embodiments will be described with reference to the accompanying drawings.

In the present embodiment, the explanation will be given with reference to a three-dimensional computer graphic system applied to a personal computer etc. for displaying a desired three-dimensional image corresponding to any three-dimensional object model on a cathode ray tube (CRT) or other display.

Figure 1:
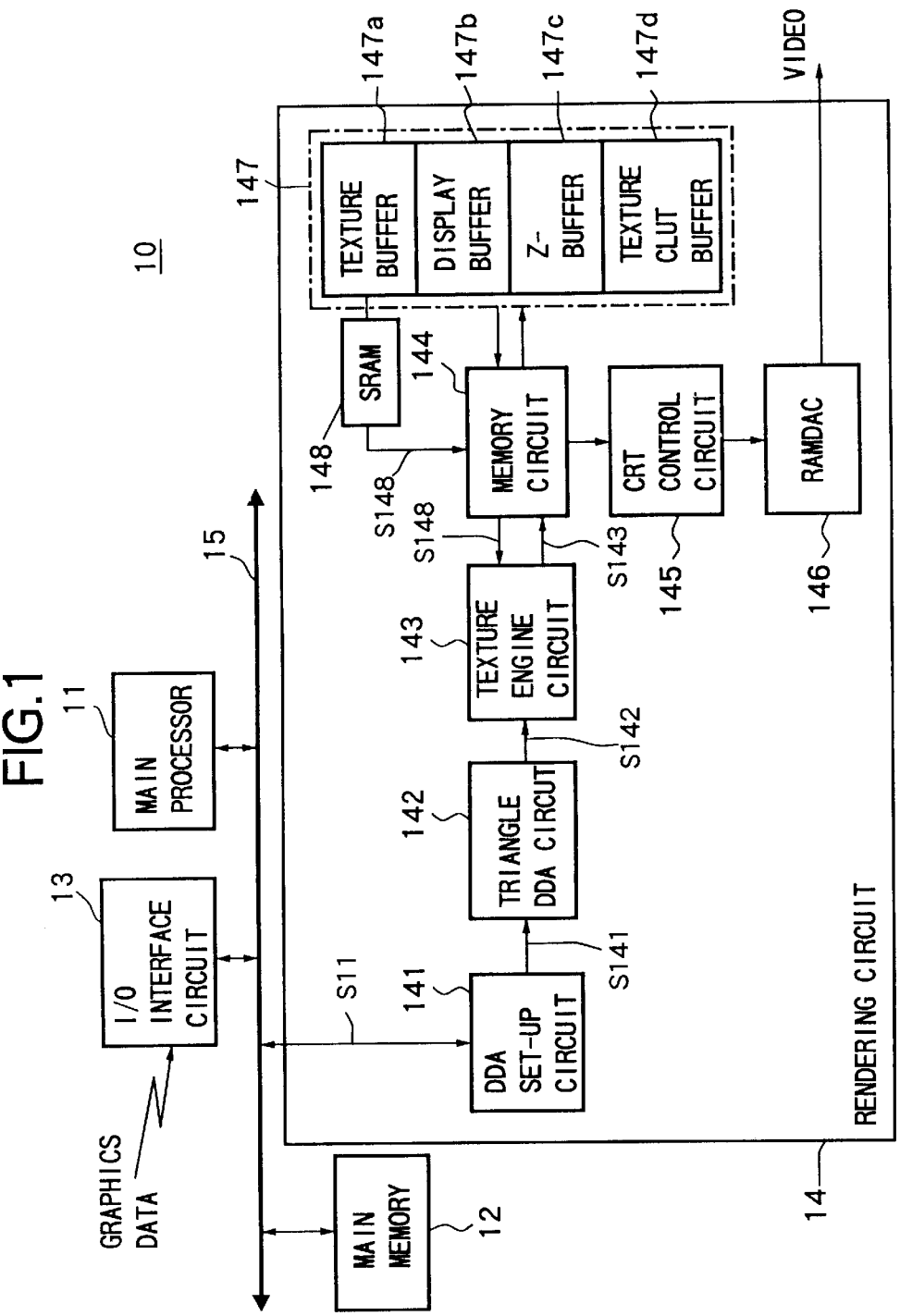
FIG. 1 is a block diagram of the configuration of a three-dimensional computer graphic system according to an embodiment of the present invention.

FIG. 1 is a view of the system configuration of a three-dimensional computer graphic system 10 of the present embodiment.

In the three-dimensional computer graphic system 10, a three-dimensional model is expressed by a composite of triangular unit graphics (polygons). By drawing the polygons, this system can decide the color of each pixel on the display screen and perform polygon rendering for display on the screen.

In the three-dimensional computer graphic system 10, a three-dimensional object is expressed by using a z-coordinate for indicating the depth in addition to the (x, y) coordinates for indicating positions on a two-dimensional plane. Any point in the three dimensional space can be expressed by the three coordinates (x, y, z).

As shown in FIG. 1, the three-dimensional computer graphic system 10 comprises a main processor 11, a main memory 12, an I/O interface circuit 13, and a rendering circuit 14 connected via a main bus 15.

Below, the operations of the respective components will be explained.

The main processor 11, for example, in accordance with the state of progress in an application, reads necessary graphic data from the main memory 12, performs clipping, lighting, geometrical processing, etc. on the graphic data and generates polygon rendering data. The main processor 11 outputs the polygon rendering data S11 to the rendering circuit 14 via the main bus 15.

The I/O interface 13 receives as input motion control information or the polygon rendering data etc. from the outside in accordance with need and outputs the same to the rendering circuit 14 via the main bus 15.

Here, the polygon rendering data includes data of each of the three vertexes (x, y, z, R, G, B, α, s, t, q) of the polygon.

Here, the (x, y, z) data indicates the three-dimensional coordinates of a vertex of the polygon, and (R, G, B, α) data indicates the luminance values of red, green, and blue at the three-dimensional coordinates and a blending value at the time of α-blending, respectively.

Among the (s, t, q) data, the (s, t) indicates homogeneous coordinates of a corresponding texture and the q indicates the homogenous term. Here, the texture size USIZE and VSIZE are respectively multiplied with the "s/q" and "t/q" to obtain coordinate data (u, v) of the texture. The texture coordinate data (u, v) is used for accessing the texture data stored in the texture buffer 147*a*.

Namely, the polygon rendering data indicates physical coordinate values of the vertexes of a triangle and values of colors of the vertexes and texture.

The rendering circuit 14 will be explained in detail below.

As shown in FIG. 1, the rendering circuit 14 comprises a digital differential analyzer (DDA) set-up circuit 141, a triangle DDA circuit 142, a texture engine circuit 143, a memory interface (I/F) circuit 144, a cathode ray tube (CRT) control circuit 145, a random access memory (RAM) DAC circuit 146, a dynamic random access memory (DRAM) 147, and a static random access memory (SRAM) 148.

In the rendering circuit 14 of the present embodiment, a logic circuit and a DRAM 147 for storing at least display data and texture data are installed together in one semiconductor chip.

DRAM147

The DRAM 147 functions as a texture buffer 147*a*, a display buffer 147*b*, a z-buffer 147*c*, and a texture color look-up table (CLUT) buffer 147*d*.

Also, the DRAM 147, in order to store more texture data, stores indexes in the index colors and values for the color look-up table therefor in the texture CLUT buffer 147*d*.

The Indexes and the values of the color look-up table are used for texture processing. Namely, a texture element is normally expressed by the total 24 bits of the 8 bits of each of R, G, and B. With this, however, the amount of data swells, so one color is selected from, for example, 256 colors selected in advance and that data is used for the texture processing. As a result, with 256 colors, the texture elements can be expressed by 8 bits. A conversion table from the indexes to an actual color is necessary, however, the higher the resolution of the texture, the more compact the texture data can become.

Due to this, compression of the texture data becomes possible and the built-in DRAM can be used efficiently.

Further, depth information of the object to be drawn is stored in the DRAM 147 for hidden plane processing simultaneously and in parallel with the drawing.

Note that as a method of storing the display data, the depth data, and the texture data, for example, the display data is stored at a predetermined position in the memory block, for example, continuously from the top, then the depth data is stored and then the texture data is stored in continuous address spaces for each type of texture in the remaining vacant region. Thus, the texture data can be efficiently stored.

Figure 2:
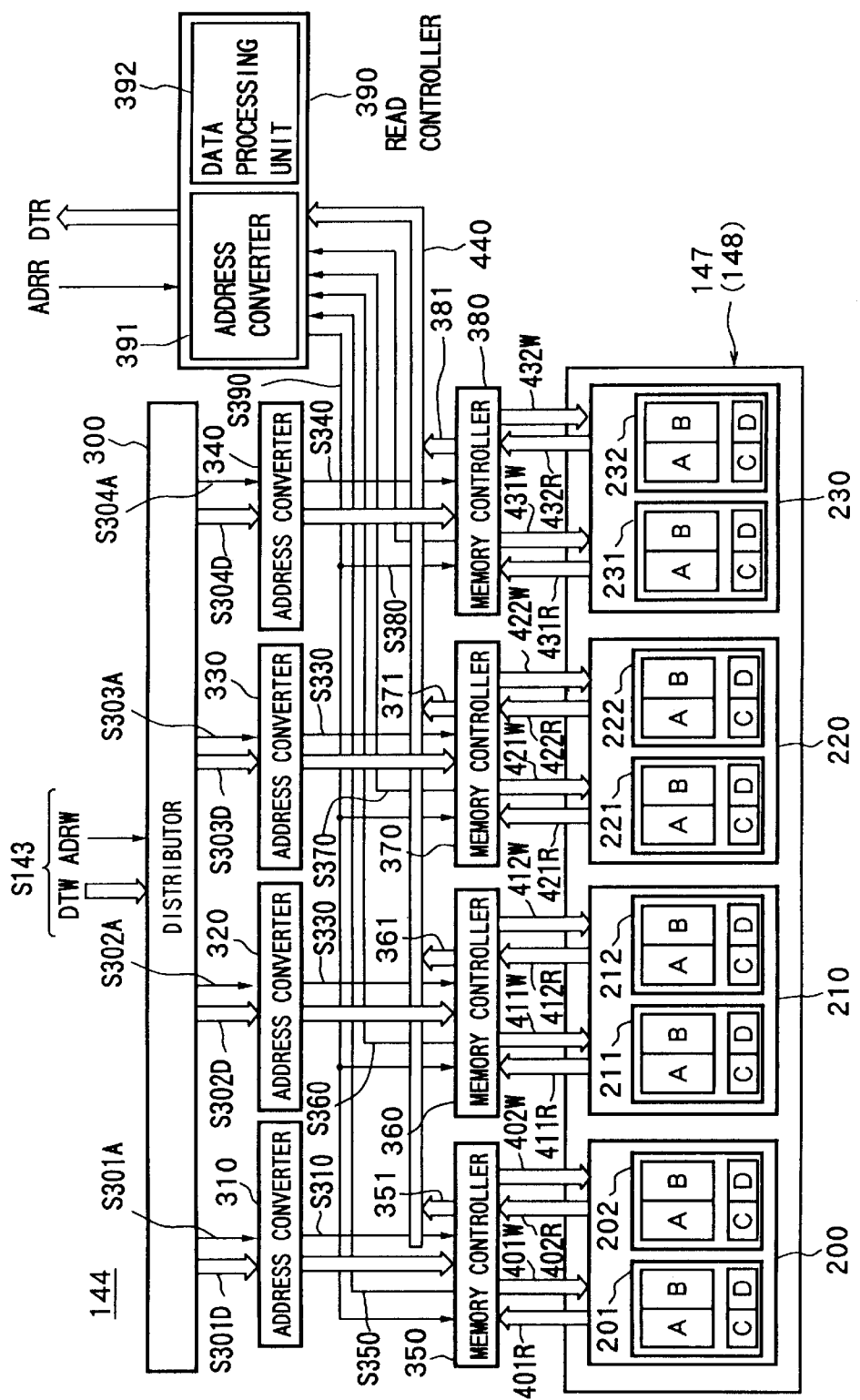
FIG. 2 is a block diagram of the configuration of a memory I/F circuit and a DRAM in FIG. 1.

FIG. 2 is a block diagram of a specific example of the configuration of the DRAM 147, the SRAM 148, and the memory I/F circuit 144 accessing the DRAM 147 and the SRAM 148.

As shown in FIG. 2, the DRAM 147 and the SRAM 148 shown in FIG. 1 are divided into four memory modules 200, 210, 220, and 230, as explained above.

The memory module 200 comprises memories 201 and 202.

The memory 201 comprises banks 201A and 201B comprising a part of the DRAM 147 and banks 201C and 201D comprising a part of the SRAM 148.

Also, the memory 202 comprises banks 202A and 202B comprising a part of the DRAM 147 and the banks 202C and 202D comprising a part of the SRAM 148.

Note that the banks 201C, 201D, 202C, and 202D comprising the SRAM 148 are simultaneously accessible.

The memory module 210 comprises memories 211 and 212.

The memory 211 comprises banks 211A and 211B comprising a part of the DRAM 147 and banks 211C and 211D comprising a part of the SRAM 148.

Also, the memory 212 comprises banks 212A and 212B comprising a part of the DRAM 147 and banks 212C and 212D comprising a part of the SRAM 148.

Note that the banks 211C, 211D, 212C, and 212D comprising the SRAM 148 are simultaneously accessible.

The memory module 220 comprises memories 221 and 222.

The memory 221 comprises banks 221A and 221B comprising a part of the DRAM 147 and banks 221C and 221D comprising a part of the SRAM 148.

Also, the memory 222 comprises banks 222A and 222B comprising a part of the DRAM 147 and banks 222C and 222D comprising a part of the SRAM 148.

Note that the banks 221C, 221D, 222C, and 222D comprising the SRAM 148 are simultaneously accessible.

The memory module 230 comprises memories 231 and 232.

The memory 231 comprises banks 231A and 231B comprising a part of the DRAM 147 and banks 231C and 231D comprising a part of the SRAM 148.

Also, the memory 232 comprises banks 232A and 232B comprising a part of the DRAM 147 and banks 232C and 232D comprising a part of the SRAM 148.

Note that the banks 231C, 231D, 232C, and 232D comprising the SRAM 148 are simultaneously accessible.

Here, each of the memory modules 200, 210, 220, and 230 has all of the functions of the texture buffer 147*a*, the display buffer 147*b*, the z-buffer 147*c*, and the texture CLUT buffer 147*d* shown in FIG. 1.

Namely, each of the memory modules 200, 210, 220, and 230 stores all of the texture data, the drawing data ((R, G, B, α) data), the z-data, and the texture color look-up table data of corresponding pixels.

Note that the memory modules 200, 210, 220, and 230 store data of mutually different pixels.

Here, the texture data, the drawing data, the z-data, and the texture color look-up table data for 16 pixels being processed simultaneously are stored in mutually different banks 201A, 201B, 202A, 202B, 211A, 211B, 212A, 212B, 221A, 221B, 222A, 222B, 231A, 231B, 232A, and 232B.

Due to this, the memory I/F circuit 144 can simultaneously access the DRAM 147 for data of, for example, 2×8 pixels, that is, 16 pixels.

Note that the memory I/F circuit 144, as will be explained later on, accesses (writes) the DRAM 147 based on so-called predetermined interleave type addressing.

Note that the banks 201C, 201D, 202C, 202D, 211C, 211D, 212C, 212D, 221C, 221D, 222C, 222D, 231C, 231D, 232C, and 232D store texture data stored in the respective banks 201A, 201B, 202A, 202B, 211A, 211B, 212A, 212B, 221A, 221B, 222A, 222B, 231A, 231B, 232A, and 232B.

The texture buffer 147a stores a unit block composed of pixel data to be simultaneously accessed so as to have a continuous addresses in a one-dimensional address space.

Below, the function of the DRAM 147 will be explained.

Figure 3:
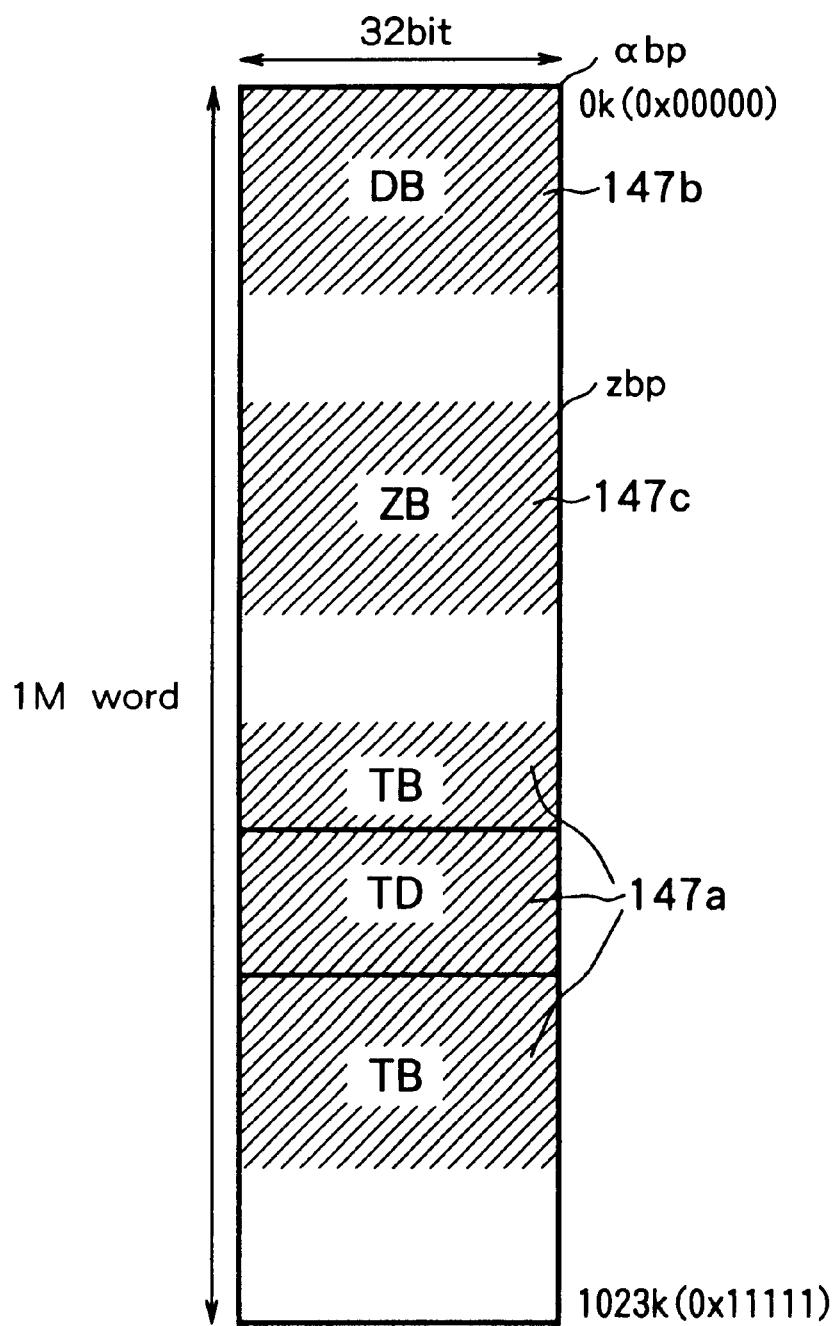
FIG. 3 is a view for explaining a function of the DRAM in FIG. 1.

A storage area of the DRAM 147 has a storage capacity of, for example, 1M word (1 word=32 bits) and is used as a display buffer 147b, z-buffer 147c, and a texture buffer 147a as shown in FIG. 3.

Note that, while not illustrated, the DRAM 147 can store data of a color look-up table (CLUT) to be used when the mode of the texture color is in an indirect mode.

Figure 4:
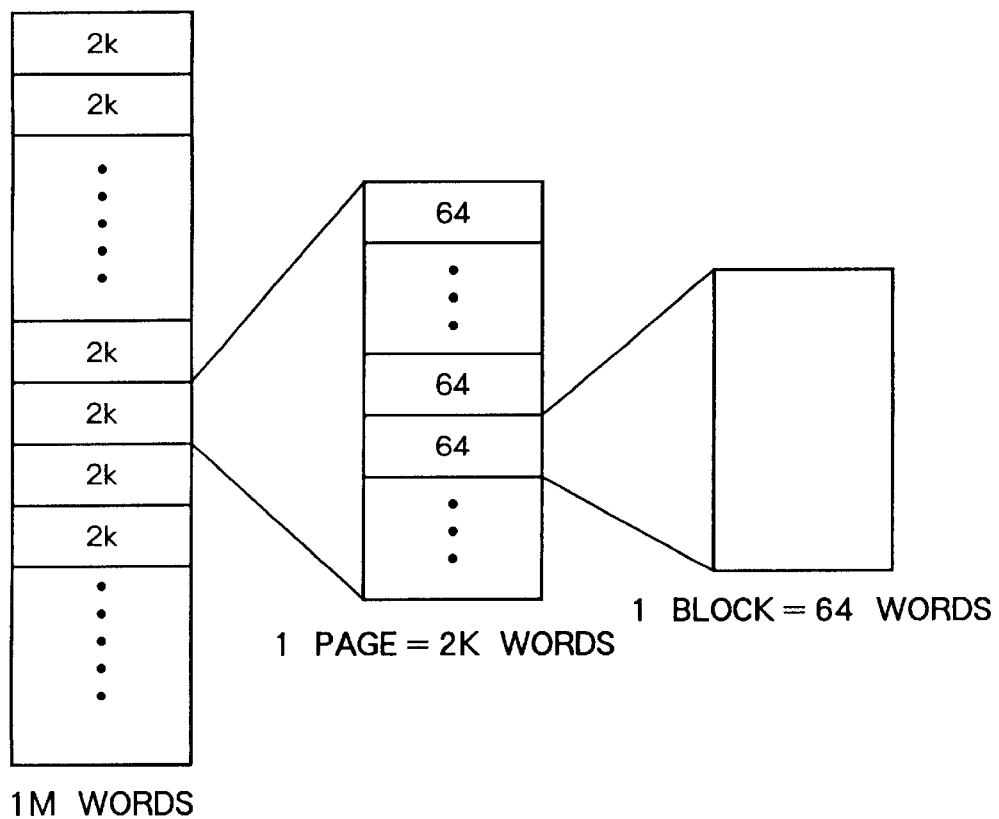
FIG. 4 is a view for explaining an address space of the DRAM in FIG. 1.

Also, the DRAM 147 is configured, as shown in FIG. 4, by 512 areas, each of which is called a page (row), of 2 k words each. Further, one page is configured by 32 areas, each of which is called a block, of 64 words each. While the display buffer 147a and z-buffer 147c are buffers configured in units of pages, the texture buffer 147b is a buffer which can be configured in the smaller units of blocks. Accordingly, a pace pointer can be set in units of a page of 2 k words in the display buffer 147a and the z-buffer 147c, while can be set in units of a block of 64 words in the texture buffer 147a.

Below, the concept of a page, block, and column will be explained by using a memory module 200.

Figure 5:
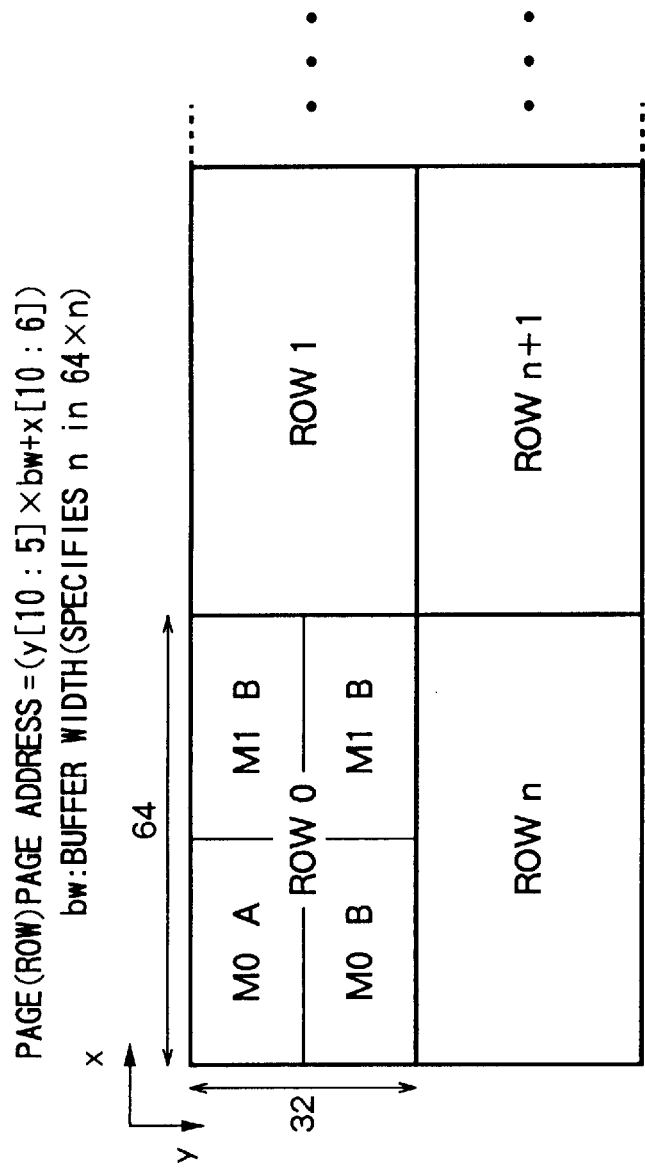
FIG. 5 is a view for explaining the concept of a page (row) in the DRAM in FIG. 1.
Figure 6:
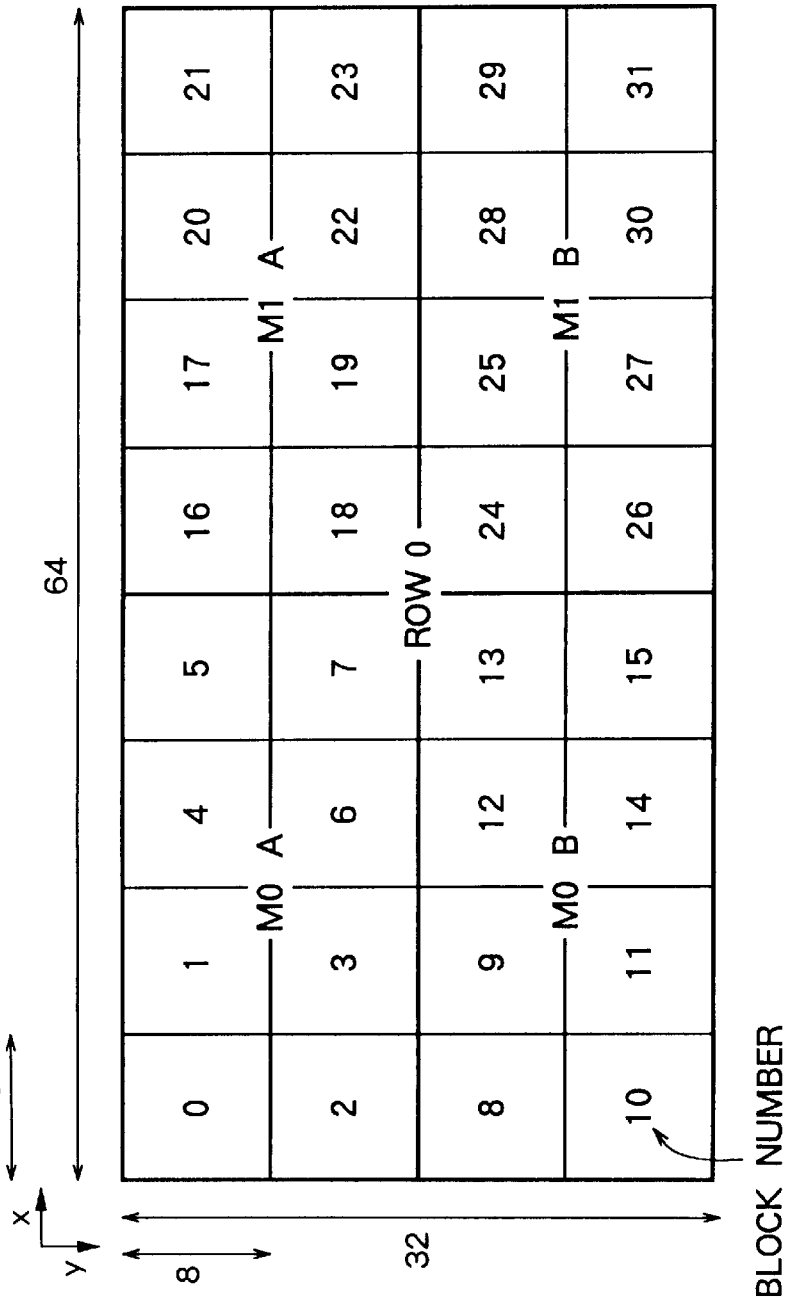
FIG. 6 is a view for explaining the concept of a block in the DRAM in FIG. 1.
Figure 7:
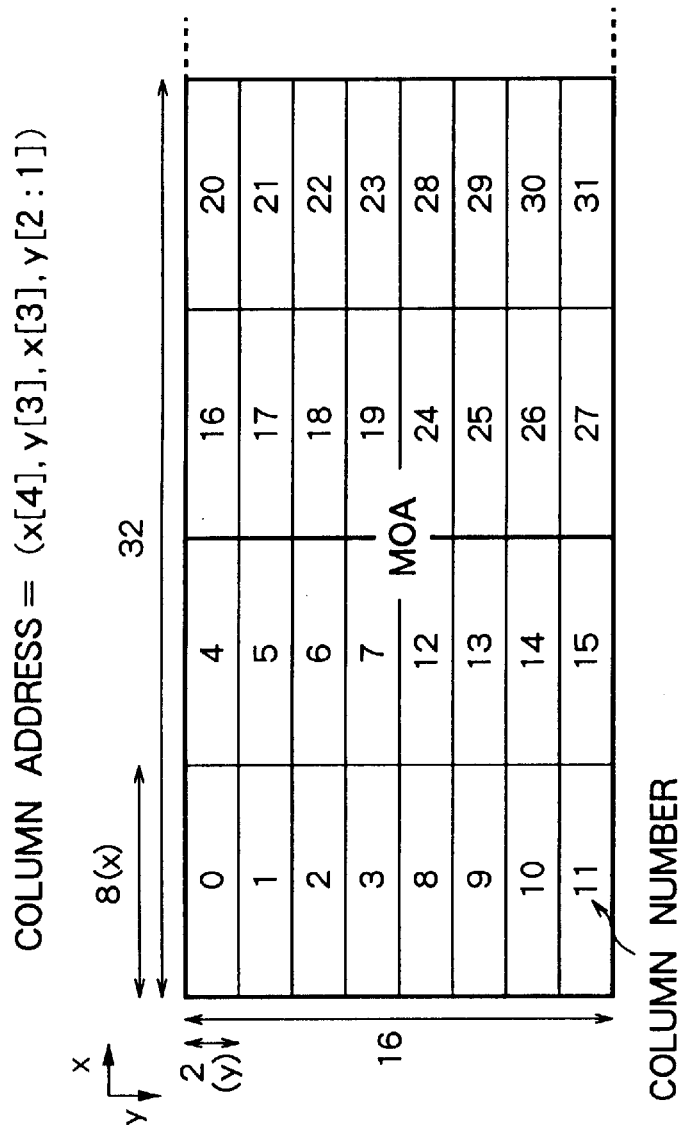
FIG. 7 is a view for explaining the concept of a column in the DRAM in FIG. 1.

As shown in FIGS. 5, 6, and 7, in the storage area of the DRAM 147, data accessed in an area of 2×8 pixels is stored in areas called a page (row), block, and column.

Each of the rows ROW0 to ROWn+1 is, as shown in FIG. 5, divided into four areas, M0A, M0B, M1A, and M1B.

The areas M0A and M0B, for example, correspond to the storage areas of the banks 201A and 201B of the memory chip 201 of the memory module 200 shown in FIG. 2, respectively. The areas M1A and M1B respectively correspond to the banks 202A and 202B of the memory chip 202 of the memory module 200 shown in FIG. 2.

Accesses (writing and reading) are performed in areas of a boundary of 8 pixels each in an x-direction and of an even number of boundaries in a y-direction.

Due to this, access is not made to an area straddling, for example, the row ROW0 and the row ROW1, so that so-called page violation does not occur.

Also, in a 32-pixel storing mode, as shown in FIG. 7, the areas M0A, M0B, M1A, and M1B are configured by 32 columns.

DDA Set-up Circuit 141

Before the later triangle DDA circuit 142 linearly interpolates the values of the vertexes of a triangle in a physical coordinate system to obtain information of the color and depth of the pixels inside the triangle, the DDA set-up circuit 141 performs a set-up operation for finding the difference from the sides of the triangle in the horizontal direction for the data (z, R, G, B, α, s, t, q) Indicated by the polygon rendering data S11.

Specifically, this set-up operation uses the values of the start point and the end point and the distance between the start point and end point to calculate the variation of the value being found when moving by a unit length.

The DDA set-up circuit 141 outputs the calculated change data S141 to the triangle DDA circuit 142.

Triangle DDA Circuit 142

The triangle DDA circuit 142 uses the change data S141 input from the DDA set-up circuit 141 to calculate linearly interpolated data (z, R, G, B, α, s, t, q) of each pixel inside the triangle.

The triangle DDA circuit 142 outputs the data (x, y) for each pixel and the (z, R, G, B, α, s, t, q) data at the (x, y) coordinates to the texture engine circuit 143 as DDA data (interpolation data) S142.

For example, the triangle DDA circuit 142 outputs the DDA data S142 of the 8 (=2×4) pixels positioned inside a block being processed in parallel to the texture engine circuit 143.

Texture Engine Circuit 143

The texture engine circuit 143 performs the calculation of "s/q" and "t/q", the calculation of the texture coordinate data (u, v), and the reading of the (R, G, B) data from the texture buffer 147a in a pipeline format.

Note that the texture engine circuit 143 performs the processing on the 8 pixels positioned inside a predetermined block simultaneously in parallel.

The texture engine circuit 143 performs the operation for dividing the data s by the data q and the operation for dividing the data t by the data q on the (s, t, q) data indicated by the DDA data S142.

The texture engine circuit 143 is provided with, for example, eight division circuits, not illustrated, and performs the division "s/q" and "t/q" simultaneously on the 8 pixels.

Also, the texture engine circuit 143 respectively multiplies the texture sizes USIZE and VSIZE with the division results "s/q" and "t/q" to generate the texture coordinate data (u, v).

The texture engine circuit 143 outputs a read request including the generated texture coordinate data (u, v) to the SRAM 148 or DRAM 147 via the memory I/F circuit 144. The texture engine circuit 143 obtains the (R, G, B) data S148 stored at the texture address corresponding to the (s, t) data by reading the texture data stored in the SRAM 148 or in the texture buffer 147a via the memory I/F circuit 144.

Here, the SRAM 148 stores the texture data stored in the texture buffer 147a as explained above.

The texture engine circuit 143 multiplies etc. the (R, G, B) data in the read (R, G, B) data S148 and the (R, G, B) data included in the DDA data S142 from the former triangle DDA circuit 142 to generate new (R, G, B) data and generates pixel data S143 storing the generated (R, G, B) data and (x, y, z, α) data included in the DDA data S142.

The texture engine circuit 143 outputs the pixel data S143 to the memory I/F circuit 144.

Note that the texture buffer 147a stores a MIPMAP (texture for a plurality of resolutions) and other texture data corresponding to a plurality of reducing rates. Here, which reducing rate texture data to use is determined in the above triangular units using a predetermined algorithm.

In the case of a full color mode, the texture engine circuit 143 directly uses the (R, G, B) data read from the texture buffer 147a.

In the case of an index color mode, the texture engine circuit 143 reads a color look-up table (CLUT), prepared in advance, from the texture CLUT buffer 147d, transfers and stores the same in the built-in SRAM, and uses the color look-up table to obtain the (R, G, B) data corresponding to the color index read from the texture buffer 147a.

Memory I/F Circuit 144

The memory I/F circuit 144 compares the z-data stored in the pixel data S143 input from the texture engine circuit 143 with the z-data stored in the z-buffer 147c and judges whether the image drawn by the input pixel data S143 is positioned closer to the viewing point than the image written in the display buffer 147b the previous time. When it is judged that the image drawn by the input pixel data S143 is positioned closer, the memory I/F circuit 144 updates the z-data stored in the z-buffer 147a by the z-data corresponding to the pixel data S143.

Also, the memory I/F circuit 144 writes the (R, G, B) data stored in the pixel data S143 to the display buffer 147b in accordance with need after performing the α-blending.

Furthermore, the memory I/F circuit 144 reads the (R, G, B) data S148 stored in the SRAM 148 when receiving a read request including the generated texture coordinate data (u, v) from the texture engine circuit 143 to the SRAM 148.

Also, when receiving a request for reading display data from the CRT control circuit 145, the memory I/F circuit 144 reads a certain amount of the display data, for example, in units of 8 pixels or 16 pixels, from the display buffer 147b in response to the request.

The memory I/F circuit 144 accesses (writes or reads to or from) the DRAM 147 and to the SRAM 148 in this way, but the write path and a read path are structured as separate paths.

Namely, when writing, a write address ADRW and write data DTW are processed in the write system and written to the DRAM 147, while when reading, processing is carried out in the read system to read from the DRAM 147 or the SRAM 148.

The memory I/F circuit 144 accesses the DRAM 147 based on a predetermined interleave type addressing in, for example, 16-pixel units.

Below, an example of a specific configuration of the memory I/F circuit 144 will be explained with reference to FIG. 2.

The memory I/F circuit 144 comprises, as shown in FIG. 2, a distributer 300, address converters 310, 320, 330, and 340, memory controllers 350, 360, 370, and 380, and a read controller 390.

[Distributor 300]

The distributer 300 distributes data for the DRAM 147 in order that data of, for example, 2×8 pixels, that is, 16 pixels, can be simultaneously accessed.

Note that the present embodiment generates addresses for addressing for accessing (writing, reading) an area of a boundary of 8 pixels in the x-direction and an even number of boundaries in the y-direction.

At the time of writing, the distributer 300 receives as input the pixel data S143 storing 16 pixels worth of data DTW comprising (R, G, B, α, z) data and an address ADRRW from the texture engine circuit 143 shown in FIG. 1.

Then the distributer 300 divides the 16 pixels' worth of data DTW to four sets of pixel data S301D, S302D, S303D, and S304D, each of which is composed of four pixels' worth of data, and outputs the same to the address converters 301, 320, 330, and 340.

Also, the distributer 300 divides the 16 pixels' worth of write address ADRRW to four write addresses S301A, S302A, S303A, and S304A, each of which is composed of four pixels' worth of write address, and outputs the same to the address converters 301, 320, 330, and 340.

Here, the R data, G data, B data, and α-data for one pixel included in the (R, G, B, α) data is composed of eight bits and the z-data is composed of 32 bits.

[Address Converters 310, 320, 330, 340]

When writing, the address converters 310, 320, 330, and 340 convert the write addresses S301A, S302A, S303A, and S304A corresponding to the (R, G, B, α) data and the z-data input from the distributer 300 to addresses in the memory modules 200, 210, 220, and 230 and output the converted addresses S310, S320, S330, and S340 and the pixel data S301D, S302D, S303D, and S304D to the memory controllers 350, 360, 370, and 380.

Here, since the address conversions in the address converters 310, 320, 330, and 340 are basically the same, the following explanation will be given taking as an example the case where the address converter 310, as shown in FIG. 6, adopts a 32-pixel storing mode structuring one page by 32 blocks.

The address converter 310 uses x[10:6] data and y[10:5] data included in the write address S301A input from the distributer 300 shown in FIG. 2 and buffer width data "bw" and base pointers "dbp" and "zbp" from a predetermined set register to generate chip select data "cs", bank select data "bs", row address "drow" and a column address "dcol" of the display buffer 147b, and a row address "drow" and a column address "zcol" of the z-buffer 147c and outputs a write address S310 including the same to the memory controller 350.

The x[10:3] data is composed of a total of 8 bits from the 3rd to 10th bits of the x-data. It indicates a two-dimensional position in the x-direction and specifies an address in the x-direction of the storage area shown in FIG. 5 in units of 64 words by the x[10:6] data.

Also, y[10:1] is composed of a total of 10 bits from the 1st to 10th bits of the y-data. It indicates a two-dimensional position in the y-direction and specifies an address in the y-direction of the storage area shown in FIG. 5 in units of 32 words by y[10:5] data.

Also, the buffer width data "bw" indicates a width (words) in the x-direction of the two dimensional storage area of the DRAM 147 shown in FIG. 5.

The base pointer "dbp" indicates a head address of the storage area to be used as the display buffer 147b in the storage area of the DRAM 147 shown in FIG. 3.

The base pointer "zbp" indicates a head address of the storage area to be used as the z-buffer 147a in the storage area of the DRAM 147 shown in FIG. 3.

Also, the chip select data "cs" is data for selecting, for example, one of the memory chips 201 and 202 shown in FIG. 2.

The bank selector data "bs" is data for selecting, for example, one of the banks A and B in the respective memory chips shown in FIG. 2.

The row address "drow" of the display buffer is data indicating an address from the base pointer "dbp" of a page in the DRAM 147.

The column address "dcol" is data indicating an address from the row address "drow" of a column in a page specified by the row address "drow" in the DRAM 147.

The row address "zrow" of the z-buffer 147c is data indicating a page address from the base pointer "zbp" of a page in the DRAM 147.

Also, the column address "zcol" is data indicating an address from the row address "zrow" of a column in a page specified by the row address "zrow" in the DRAM 147.

Below, the configuration inside the address converter 310 will be explained.

Figure 8:
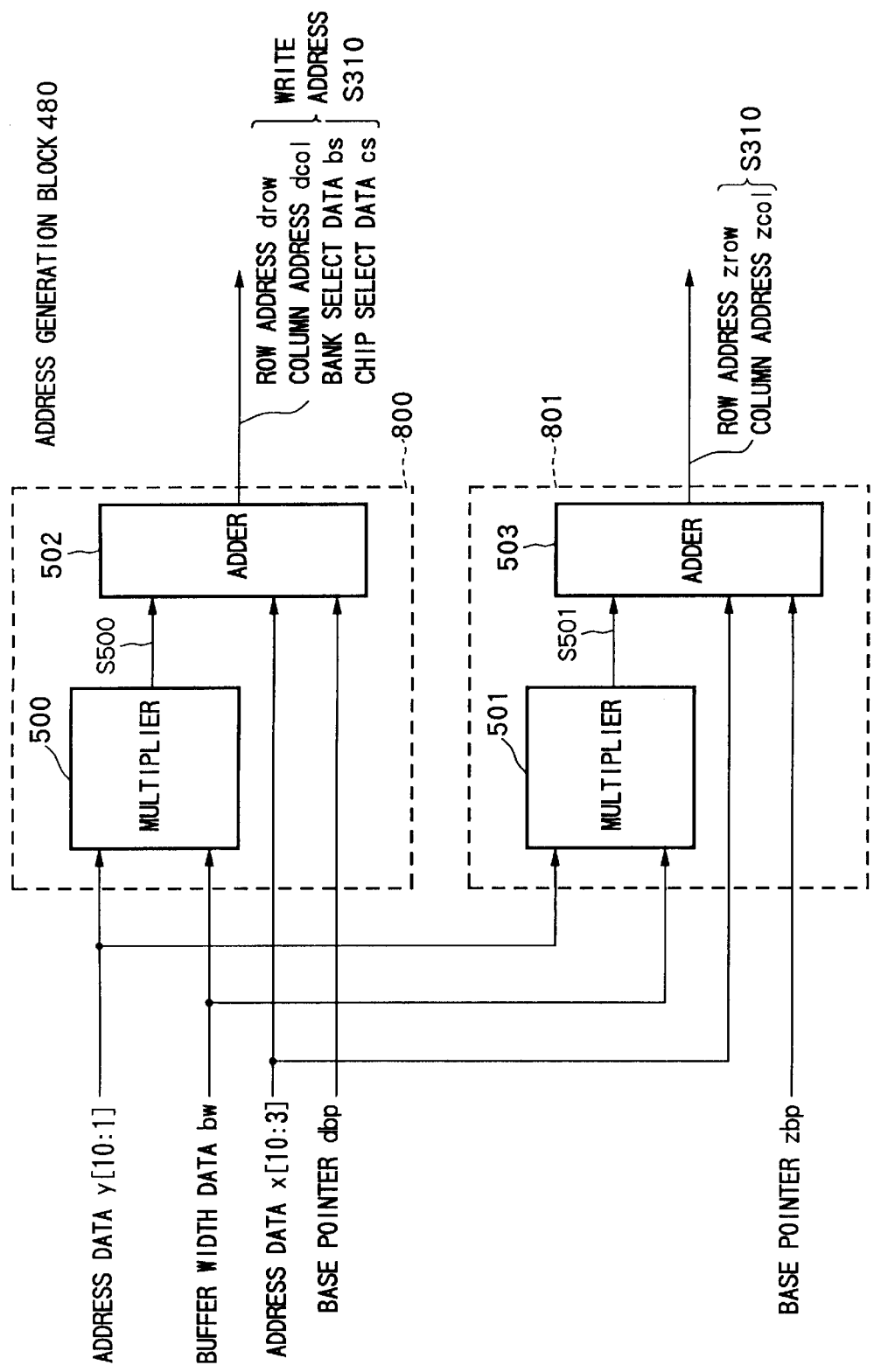
FIG. 8 is a block diagram of one pixel's worth of an address generation block in an address converter in FIG. 2.

FIG. 8 is a view of the configuration of an address generation block 480 for generating one pixel's worth of write address included in the address converter 310.

The address converter 310 is provided with four built-in address generation blocks 480 shown in FIG. 8 for performing processing simultaneously on four pixels.

The address generation block 480 for generating an address corresponds to the address generation circuit of the present invention.

As shown in FIG. 8, the address generation block 480 comprises multipliers 500 and 501 and adders 502 and 503.

Here, the multiplier 500 and the adder 502 are used for calculating a write address of pixel data in the data S301D to the display buffer 147b, and the multiplier 501 and the adder 503 are used for calculating a write address of the z-data in the data S301D to the z-buffer 147c.

In the present embodiment, circuit pattern generating data describing functions of the memory I/F circuit 144 is prepared by using a hardware language, such as the Verilog Hardware Description Language (VHDL) and automatically generates a circuit pattern from the circuit pattern generating data. At this time, in the circuit pattern generating data, the multiplier 500 and the adder 502 shown in FIG. 8 are handled as one micro cell 800 and the multiplier 501 and the adder 503 are handled as one micro cell 801. As a result, the design process of a plurality of address generation blocks 480 installed in the memory I/F circuit 144 can be used in common, a circuit configuration arranging the multiplier 500, adder 502, multiplier 501, and adder 503 physically close to each other can be realized, and the circuit operation can be made high in speed.

The multiplier 500 multiplies the address data y[10:1] with the buffer width data "bw" and outputs the multiplied result S500 to the adder 502.

The adder 502 adds the multiplied result S500, the address data [10:3], and the base pointer "dbp" and outputs the added result included in the address S310 shown in FIG. 2 to the memory controller 351. At this time, predetermined bits in the added result output from the adder 502 indicate the row address "drow", column address "dcol", bank select data "bs", and chip select data "cs".

Also, the multiplier 501 multiplies the address data y[10:1] with the buffer width data "bw" and outputs the multiplied result S501 to the adder 503.

The adder 503 adds the multiplied result S501, address data [10:3], and the base pointer "zbp" and outputs the added result included in the address S310 shown in FIG. 2 to the memory controller 351. At this time, predetermined bits in the added result output from the adder 503 indicate the row address "zrow" and the column address "zcol".

In the above address conversion, the address generation block 480 calculates and generates the row address "drow", column address "dcol", row address "zrow", and column address "zcol" based on the formulas (1) to (4) below.

$$drow = y[10:5] \times bw + x[10:6] + dbp \quad (1)$$
$$dcol = \{x[4], y[3], x[3], y[2:1]\} \quad (2)$$
$$zrow = y[10:5] \times bw + x[10:6] + zbp \quad (3)$$
$$zcol = \{x[4], y[3], x[3], y[2:1]\} \quad (4)$$

[Memory Controllers 350, 360, 370, 380]

The memory controllers 350, 360, 370, and 380 are respectively connected to the memory modules 200, 210, 220, and 230 via a wiring group of the write system 401W, 402W, 411W, 412W, 421W, 422W, 431W, and 432W and a wiring group of the read system 401R, 402R, 411R, 412R, 421R, 422R, 431R, and 432R and control access to the memory modules 200, 210, 220, and 230 at the time of writing and reading.

Specifically, when writing, the memory controllers 350, 360, 370, and 380 simultaneously write the four pixels' worth of (R, G, B, α) data and z-data output from the distributer 300 and input from the address converters 350, 360, 370, and 380 to the memory modules 200, 210, 220, and 230 via the wiring group of the write system 401W, 402W, 411W, 412W, 421W, 422W, 431W, and 432W.

At this time, as explained above, for example, the memory module 200 stores one pixel worth of the (R, G, B, α) data and z-data in each of the banks 201A, 201B, 202A, and 202B. The same is true for the memory modules 210, 220, and 230.

Also, the memory controllers 350, 360, 370, and 380 output idle signals S350, S360, S370, and S380 to the read controller 390 as active when their own state machines are in an idle state. Receiving read addresses and a read request signal S391 by the read controller 390 in response to the idle signals S350, S360, S370, and S380, the memory controllers 350, 360, 370, and 380 read data via the wiring group of the read system 401R, 402R, 411R, 412R, 421R, 422R, 431R, and 432R and output the same to the read controller 390 via the wiring group of the read system 351, 361, 371, and 381 and a wiring group 440.

Note that, in this embodiment, the number of wires of the wiring group of the write system 401W, 402W, 411W, 412W, 421W, 422W, 431W, and 432W and the wiring group of the read system 401R, 402R, 411R, 412R, 421R, 422R, 431R, and 432R is 128 (128 bits). The number of wires of the wiring groups 351, 361, 371, and 381 of the read system is 256 (256 bits). The number of wires of the wiring group 440 of the read system is 1024 (1024 bits).

When writing four pixels' worth of (R, G, B, α) data included in the pixel data S301D, S302D, S303D, and S304D input from the address converters 310, 320, 330, and 340 to an address in the DRAM 147 designated by the write addresses S310, S320, S330, and S340, the memory controllers 350, 360, 370, and 380 perform so-called α-blending on each pixel for blending the input (R, G, B) data and the (R, G, B) data already stored in the designated address by a blending ratio indicated by the α data to generate new (R, G, B) data and for writing the (R, G, B, α) data composed of the generated (R, G, B) data and the input α data to a designated address in the DRAM 147.

Figure 9:
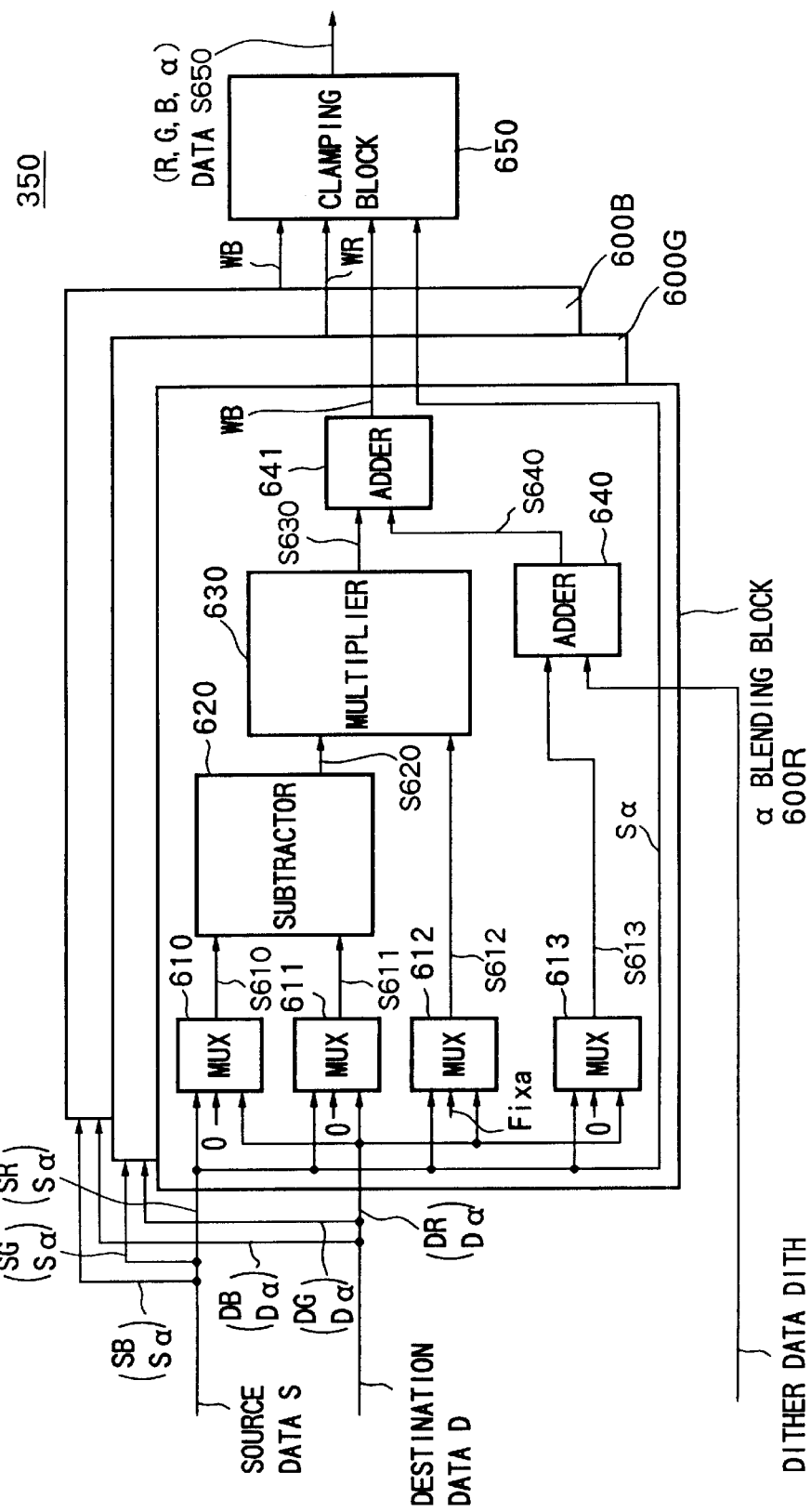
FIG. 9 is a block diagram of one pixel's worth of an α-blending block of a memory controller in FIG. 2.

FIG. 9 is a view of the configuration of an α-blending block for performing α-blending for one pixel in the memory controller 350.

As shown in FIG. 9, the memory controller 350 comprises α-blending blocks 600R, 600G, and 600B for each pixel and has the same for four pixels.

The α-blending blocks 600R, 600G, and 600B correspond to the color generation circuits of the present invention.

The α-blending blocks 600R, 600G, and 600B are the same except for performing the processing separately on R data, G data, and B data.

In the present embodiment, at the time of designing a circuit pattern of the memory I/F circuit 144 by using, for example, a hardware description language such as VHDL, the α-blending blocks 600R, 600G, and 600B are respectively handled as micro cells. As a result, the design process of the α-blending blocks 600R, 600G, and 600B installed in the memory I/F circuit 144 can be used in common, components can be arranged physically close to each other for the respective α-blending blocks 600R, 600G, and 600B, and the circuit operation can be made high in speed.

Note that, for example, the α-blending blocks 600R, 600G, and 600B may be designed as one micro cell.

In FIG. 9, the source data S is (R, G, B, α) data for one pixel input from the address converter 310.

Also, the destination data D is (R, G, B, α) data for one pixel already stored in the address in the DRAM 147 to be written the source data S.

The α-blending block 600R receives as input R data of the source data S, data SR and Sα as α data, R data of the destination data D, data DR and Dα as α data, and dither data DITH. The dither data is used for thinning out data.

Also, the α-blending block 600R generates data WR indicating R data to be written in the DRAM 147 and outputs the same to a clamping block 650.

The α-blending block 600G receives as input G data of the source data S, data SG and Sα as α data, G data of the destination data D, data DG and Dα as α data, and dither data DITH. The dither data is used for thinning out data.

Also, the α-blending block 600G generates data WR indicating R data to be written in the DRAM 147 and outputs the same to a clamping block 650.

The α-blending block 600B receives as input B data of the source data S, data SB and Sα as α data, B data of the destination data D, data DB and Dα as α data, and dither data DITH. The dither data is used for thinning out data.

Also, the α-blending block 600B generates data WR indicating R data to be written in the DRAM 147 and outputs the same to a clamping block 650.

Below, α-blending block 600R will be explained in detail.

As shown in FIG. 9, the α-blending block 600R comprises multiplexers 610, 611, 612, and 613, a subtractor 620, multiplier 630, and adders 640 and 641.

The multiplexers 610 and 611 receive as input data SR, data DR, and a logic value "0", select one from the same based on not shown control data, and output the same to the subtractor 620 as data S610 and S611, respectively.

The multiplexer 612 receives as input data SR, data DR, and Fixα as a fixed α-value, selects one from the same based on not shown control data, and outputs it to the multiplier 630 as data S612.

The multiplexer 613 receives as input data SR, data DR, and a logic value "0", selects one from the same based on not shown control data, and outputs it to the adder 640 as data S613.

The subtractor 620 performs subtraction for subtracting the data S611 from the data S610 and outputs data S620 indicating the subtracted result to the multiplier 630.

The multiplier 630 performs multiplication for multiplying the data S620 with the data S612 and outputs data S630 indicating the multiplied result to the adder 641.

The adder 640 performs addition for adding the data S613 and the dither data DITH and outputs data S640 indicating the added result to the adder 641.

The adder 641 performs addition for adding the data S630 and the data S640 and outputs data WR indicating the added result to the clamping block 650 in the latter stage.

Here, the data WR indicates R data to be written in the DRAM 147.

Below, an example of the operation of the α-blending block 600R shown in FIG. 9 will be explained.

Here, a case of the operation using the α-blending block 600R for α-blending of the formula (5) below will be explained.

$$WR=(SR-DR) \times D\alpha + DITH \quad (5)$$

In this case, based on a not shown control signal, the data SR is selected in the multiplexer 610, the data DR is selected in the multiplexer 611, the data Dα is selected in the multiplexer 612, and the logic value "0" is selected in the multiplexer 613.

Next, the subtractor 620 subtracts the data DR from the data SR and outputs the subtracted result "SR−DR" to the multiplier 630.

Next, the multiplier 630 multiplies the subtracted result "SR-DR" and the data Dα and outputs the multiplied result "(SR−DR)×Dα" to the adder 641.

Also, in parallel with the above, the adder 640 adds the logic value "0" and the dither data DITH and outputs the added result "DITH" to the adder 641.

Next, the adder 641 adds the multiplied result "(SR−DR)× Dα" and the added result "DITH" and outputs the added result "(SR−DR)×Dα+DITH" as data WR to the clamping block 650.

The processing of the α-blending 600G is the same as that of the above α-blending 600R except for the data SG and DG.

Also, the processing of the α-blending 600B is the same as that of the above α-blending 600R except for the data SB and DB.

The clamping block 650 performs clamping on the data WR, WG NS WB input from the α-blending blocks 600R, 600G, and 600B for rounding off several lower bits for adjusting the data length to within 32 bits so as to generate 32 bits of (R, G, B, α) data S650.

The memory controller 350 writes the (R, G, B, α) data S650 to an address in the display buffer 147b of the DRAM 147 specified by the address S310 from the address converter 310.

Also, the corresponding z-data Is written to the address inside the z-buffer 147c of the DRAM 147 specified by the address S310 from the address converter 310.

Note that when the processing of the distributer 300 shown in FIG. 2, the processing of the address converters 310, 320, 330, and 340, and the processing of the memory controllers 350, 351, 352, and 353 are performed successively in a pipeline format, a flip-flop for adjusting the timing is respectively provided for example inside the multiplier 630 and on the input side of the adder 640 in FIG. 9.

[Read Controller 390]

The read controller 390 is configured by an address converter 391 and a data processing portion 392.

When receiving a read address ADRR, if the address converter 391 receives all of the idle signals S350, S360, S370, and S380 from the memory controllers 350, 360, 370, and 380 as active, the address converter 391 outputs read addresses and a read request signal S391 to the memory controllers 350, 360, 370, and 380 in order to read data in units of 8 pixels or 16 pixels in response to the idle signals S350, S360, S370, and S380.

The data processing portion 392 receives as input the texture data, the (R, G, B) data, the z-data, and the texture color look-up table data in units of 8 pixels or 16 pixels read from the memory controllers 350, 360, 370, and 380 via the wiring group 440, performs predetermined processing, and outputs the result to a requested destination, for example, to the texture engine circuit 143 or the CRT control circuit 145.

As explained above, when all of the memory controllers 350, 360, 370, and 380 are in an idle state, the read controller 390 outputs the read addresses and read request signal S391 to the memory controllers 350, 360, 370, and 380 and receives the read data, therefore can synchronize the read data.

Accordingly, the read controller 390 does not require a first-in first-out (FIFO) circuit or other holding circuit for temporarily holding data. Thus, the size of the circuit can be reduced.

CRT Control Circuit 145

The CRT control circuit 145 generates an address for display on a not shown CRT in synchronization with given horizontal and vertical synchronization signals and outputs a request for reading the display data from the display buffer 147*b* to the memory I/F circuit 144. In response to this request, the memory I/F circuit 144 reads a certain amount of the display data from the display buffer 147*b*. The CRT control circuit 145 has a built-in FIFO circuit for storing the display data read from the display buffer 147*b* and outputs the index value of RGB to the RAMDAC circuit 146 at certain time intervals.

RAMDAC Circuit 146

The RAMDAC circuit 146 stores the R, G, B data corresponding to the respective index values. It transfers R, G, B data of a digital format corresponding to the index value of RGB input from the CRT control circuit 145 to a not illustrated digital/analog (D/A) converter to generate R, G, B data of an analog format. The RAMDAC circuit 146 outputs the generated R, G, B data to the CRT.

Next, the operation resulting from the above configuration will be explained.

The three-dimensional computer graphic system 10 supplies data of drawing graphics eta. from the main memory 12 of the main processor 11 or from the I/O interface circuit 13, which receives graphic data from the outside, to the rendering circuit 14 via the main bus 15.

Note that the data for drawing graphics etc. are, in accordance with need, subjected to coordinate conversion, clipping, lighting, and other geometric processing in the main processor 11 etc.

The graphic data after the geometric processing becomes polygon rendering data S11 composed of the coordinates x, y, z of the respective three vertexes of a triangle, the luminance values R, G, B, and the texture coordinates s, t, q corresponding to the pixel to be drawn.

The polygon rendering data S11 is input to the DDA set-up circuit 141 of the rendering circuit 14.

The DDA set-up circuit 141 generates change data S141 indicating the difference with a side of the triangle from a horizontal direction etc. based on the polygon rendering data S11. Specifically, it calculates the change, that is, the amount of change of the values to be obtained in the case of movement by a unit length, by using the start point, the end point, and the distance between the two and outputs it to the triangle DDA circuit 142 as change data S141.

The triangle circuit 142 uses the change data S141 for calculation of the linearly interpolated data (z, R, G, B, α, s, t, q) of each of the pixels inside the triangle.

Then, the calculated (z, R, G, B, α, s, t, q) data and the (x, y) data of each of the vertexes of the triangle are output from the triangle DDA circuit 142 to the texture engine circuit 143 as DDA data S142.

The texture engine circuit 143 performs the operation for dividing the data s by the data q and the operation for dividing the data t by data q for the (s, t, q) data indicated by the DDA data S142. Then, it multiplies the texture sizes USIZE and VSIZE with the division results "s/q" and "t/q" to generate the texture coordinate data (u, v).

Next, a read request including the above generated texture coordinate data (u, v) is output from the texture engine circuit 143 to the memory I/F circuit 144. Then, the (R, G, B) data S148 stored in the SRAM 148 is read via the memory I/F circuit 144.

Next, the texture engine circuit 143 multiplies etc. the (R, G, B) data in the read (R, G, B) data S148 and the (R, G, B) data included in the DDA data S142 from the former triangle DDA circuit 142 to generate new R, G, B data and the pixel data S143 storing (x, y, z, α) data included in the DDA data S142.

This pixel data S143 is output from the texture engine circuit 143 to the main memory I/F circuit 144. In the case of a full color mode, the (R, G. B) data read from the texture buffer 147*a* can be directly used, while in the case of an index color mode, data in the color look-up table (CLUT), prepared in advance, is transferred from the texture CLUT buffer 147*d* to a buffer for temporary storage, which is configured by an SRAM eta. By using the CLUT of the temporary storage buffer, the actual R, G, B colors can be obtained from the color index.

Note that when the CLUT is configured by an SRAM, when a color index is input to an address of the SRAM, the actual R, G, B colors are output.

Next, write addresses for pixel data for 16 pixels are calculated by using corresponding address generation blocks 480 shown in FIG. 8 in the address converters 310, 320, 330 and 340 in the memory I/F circuit shown in FIG. 2.

The memory I/F circuit 144 compares the z-data corresponding to the pixel data S143 input from the texture engine circuit 143 and the z-data stored at the above calculated address in the z-buffer 147*c* for judging whether the image drawn by the input pixel data S143 is positioned closer to the viewing point than the image written in the display buffer 147*b* the previous time.

When it judges that the image drawn by the input pixel data S143 is positioned closer, the z-data included in the pixel data S143 stored in the buffer 147*c* is updated.

Next, the memory controllers 350, 360, 370, and 380 in the memory I/F circuit 144 shown in FIG. 2 perform α-blending using the (R, G, B, α) data included in the pixel data S143 and writes the thus obtained (R, G, B, α) data to the display buffer 147*b*.

The data to be written (including to be updated) is supplied to the memory controllers 350, 360, 370, and 380 via the distributor 300 and the address decoders 310, 320, 330 and 340 as write system circuits and written in parallel to a predetermined memory by the memory controllers 350, 360, 370, and 380 via the wiring group of the write system 401W, 402W, 411W, 412W, 421W, 422W, 431W and 432W.

At this time, the memory controllers 350, 360, 370, and 380, in the α-blending, blend the input (R, G, B) data and the (R, G, B) data already stored at the designated address by a blending ratio indicated by the a data so as to generate new (R, G, B) data for each of the pixels for the four pixels' worth of (R, G. B, α) data included in the pixel data S301D, S302D, S303D, and S304D input from the address converters 310, 320, 330, and 340.

Then, the memory controllers 350, 360, 370, and 380 write the (R, G, B, α) data composed of the generated (R, G, B) data and the input α data at designated addresses in the DRAM 147.

Also, when displaying the image on a not illustrated CRT, a CRT control circuit 145 generates a display address in synchronization with a given horizontal and vertical synchronization frequency and outputs a request for transferring the display data to the memory I/F circuit 144.

In response to the request, the memory I/F circuit 144 transfers a certain amount of the display data to the CRT control circuit 145.

The CRT control circuit 145 stores the display data in a not shown display FIFO etc. and transfers the index value of RGB to the RAMDAC 146 at certain time intervals.

As explained above, according to the present embodiment, the write address generation for the 16 pixels' worth of pixel data is performed in parallel by using the address generation blocks 480 shown in FIG. 8 so that a high speed is attainable in the address generation.

Also, according to the present embodiment, as shown in FIG. 8, by designing using the micro cells 800 and 801 in one pixel's worth of the address generation block 480, high speed processing is attainable in the address converters 310, 320, 330, and 340.

Furthermore, by generating the write addresses S310, S320, S330, and S340 by using the address generation block shown in FIG. 8 as explained above, 16 pixels' worth of pixel data to be simultaneously accessed are assigned to mutually different banks 201A, 201B, 202A, 202B, 211A, 211B, 212A, 212B, 221A, 221B, 222A, 222B, 231A, 231B, 232A, and 232B.

As a result, according to the three-dimensional computer graphic system 10, 16 pixels' worth of (R, G, B, α) data can be simultaneously written to the display buffer 147b in the DRAM 147, so that the processing speed can be improved.

Also, according to the present embodiment, as shown in FIG. 9, a high speed is attained in the α-blending by performing the α-blending on the respective pixel data in parallel for the R data, G data, and B data.

Furthermore, according to the present embodiment, as shown in FIG. 9, by respectively designing the α-blending 600R, 600G, and 600B for one pixel by using micro cells, a high speed α-blending is attained in the memory controllers 350, 360, 370, and 380.

As a result, according to the three-dimensional computer graphic system 10, the processing speed can be improved.

Also, in the present embodiment, in the memory I/F circuit 144 for accessing (writing or reading) the DRAM 147 and the SRAM 148, the write path and the read path are configured as separate paths. At the time of writing, the write address ADRW and the write data DTW are processed in the distributer 300, the address converters 310, 320, 330, and 340, and the memory controllers 350, 360, 370, and 380 forming the write system circuit to be written to the DRAM 147, while when reading, the processing is performed by the read controller 390 and the memory controllers 350, 360, 370, and 380 forming the read system circuit to read from the DRAM 147 or the SRAM 148. Thus, at the time, for example, when a reading operation etc. cuts in, the processing can be switched at a fast timing and the performance at the time of reading can be improved.

Furthermore, according to the present embodiment, due to the configuration storing display data and texture data required by at least one graphic element in the built-in DRAM 147 in a semiconductor chip, the texture data can be stored in portions other than a display area, the built-in DRAM can be efficiently used, and an image data processing apparatus capable of attaining both a high speed operation and reduction in the power consumption can be realized.

Further, a single memory system can be realized and all processing can be carried out inside. As a result, there is a large paradigm shift in terms of the architecture as well.

Also, since the memory can be efficiently used, the processing can be carried out by just the DRAM included inside. Therefore, the wide bandwidth between the memory and the drawing system resulting from the internal provision can be sufficiently utilized. Also, it becomes possible to install specific processing in the DRAM.

Note that the present invention is not limited to the above embodiments.

In the above three-dimensional computer graphic system 10 shown in FIG. 1, the example was given of a configuration using an SRAM 148, however, it can be configured without the SRAM 148 as well.

Furthermore, in the three-dimensional computer graphic system 10 shown in FIG. 1, the example was given wherein the geometric processing for generating the polygon rendering data was performed in the main processor 11, but the processing can be carried out in the rendering circuit 14 as well.

Also, in the above embodiments, the example was given wherein pixel data for 16 pixels were simultaneously written to the DRAM 147, but any number of pixel data can be simultaneously written.

Summarizing the effect of the invention, as explained above, according to the image data processing apparatus of the present invention, high speed processing can be realized.

While the invention has been described with reference to specific embodiment chosen for purpose of illustration, it should be apparent that numerous modifications could be made thereto by those skilled in the art without departing from the basic concept and scope of the invention.

What is claimed is:

1. An image data processing upparatus comprising:
    a storage circuit having a plurality of storage areas able to be simultaneously written with a plurality of pixel data and storing a plurality of pixel data indicating colors of a plurality of pixels arranged in a matrix;
    a plurality of address generation circuits provided corresponding to the plurality of pixel data simultaneously written to the storage areas and generating write addresses as addresses in the storage areas of the storage circuit for writing corresponding pixel data; and
    a write circuit for writing a plurality of pixel data to said write addresses in said storage areas; wherein
    said pixel data includes color data indicating said color and a first position data and a second position data respectively indicating a two-dimensional position of a corresponding pixel in the x-direction and y-direction; and
    said address generation circuit comprises:
        a multiplying circuit for multiplying said second position data with a width data in accordance with a width of said storage area in the x-direction and
        an adder circuit for generating said write address by adding only said first position data and the multiplied result of said multiplying circuit.

2. An image data processing apparatus comprising:
    a storage circuit having a plurality of storage areas able to be simultaneously written with a plurality of pixel data and storing a plurality of pixel data indicating colors of a plurality of pixels arranged in a matrix;

a plurality of address generation circuits provided corresponding to the plurality of pixel data simultaneously written to the storage areas and generating write addresses as addresses in the storage areas of the storage circuit for writing corresponding pixel data; and a write circuit for writing a plurality of pixel data to said write addresses in said storage areas; wherein said pixel data includes color data indicating said color, a first position data and a second position data respectively indicating a two-dimensional position of a corresponding pixel in the x-direction and y-direction and depth data to be used at the time of performing three-dimensional display processing; and said address generation circuit comprises:

a first multiplying circuit for multiplying said second position data and width data in accordance with a width of said storage area in the x-direction;

a first adding circuit for adding said first position data, a multiplied result of said first multiplying circuit, and a first address data for indicating a head address of a predetermined first storage area for storing color data in said storage area to generate said write address of said color data;

a second multiplying circuit for multiplying said second position data and said width data; and a second adding circuit for adding said first position data, a multiplied result of said second multiplying circuit, and a second address data for indicating a head address of a predetermined second storage area for storing depth data in said storage area to generate said write address of said depth data.

3. An image data processing apparatus as set forth in claim 1, wherein when automatically generating a circuit pattern of at least part of the circuits based on circuit pattern generation data describing at least part of the circuit functions of said image data processing apparatus using a hardware description language, the functions of said multiplying circuit and said adding circuit are written in the same macro cell in said circuit pattern generation data.

4. An image data processing apparatus comprising:

a storage circuit having a plurality of storage areas able to be simultaneously written with the plurality of first pixel data and storing a plurality of first pixel data indicating colors of a plurality of pixels arranged in a matrix;

a plurality of pixel data generation circuits provided, one for each of the simultaneously written plurality of first pixel data and each performing color blending using second pixel data and third pixel data for blending a color indicated by the corresponding second pixel data and a color indicated by the third pixel data stored at a write address by a predetermined blending ratio to generate a new color so as to generate first pixel data indicating a new color; and a write circuit for simultaneously writing the plurality of said first pixel data generated to said storage areas of said storage circuit; wherein said pixel data generation circuit comprises:

a subtracting circuit for subtraction using said corresponding color data of said second pixel data and said corresponding color data of said third pixel data and a multiplying circuit for multiplying a subtracted result of said subtracting circuit with blending ratio data indicating said blending ratio.

5. An image data processing apparatus as set forth in claim 4, wherein:

said first pixel data, said second pixel data, and said third pixel data include a plurality of colors and indicate colors by combining values indicated by the plurality of color data and each said pixel data generation circuit comprises a plurality of color data generation circuits provided corresponding to the plurality of color data and each performing color blending using said corresponding color data of said second pixel data and said third pixel data for blending a color indicated by said corresponding color data of said corresponding second pixel data and a color indicated by said corresponding color data of the third pixel data stored at said write address by a predetermined blending ratio to generate a new color and thereby generate said corresponding color data of said first pixel data indicating said new color.

6. An image data processing apparatus as set forth in claim 4, wherein said pixel data generation circuit further comprises an adding circuit for adding a multiplied result of said multiplying circuit and dither data.

7. An image data processing apparatus as set forth in claim 4, wherein when automatically generating the circuit pattern of at least part of the circuits based on circuit pattern generation data describing at least part of the circuit functions of said image data processing apparatus using a hardware description language, the functions of said subtracting circuit and said multiplying circuit of said pixel data generation circuit are written in the same macro cell in said circuit pattern generation data.

8. An image data processing apparatus as set forth in claim 4, wherein when automatically generating a circuit pattern of at least part of the circuits based on circuit pattern generation data describing at least part of the circuit functions of said image data processing apparatus using a hardware description language, the functions of said plurality of color data generation circuits are written in the same macro cell in said circuit pattern generation data.

9. An image data processing apparatus for defining a three-dimensional model by combining a plurality of unit graphics and generating pixel data indicating a color for each pixel data indicating a color for each pixel arranged in a matrix in a display device, comprising:

a polygon rendering data generation circuit for generating polygon rendering data including R (red), G (green), and B (blue) data for vertexes of said unit graphics;

a data interpolation circuit for interpolating the polygon rendering data of vertexes of said unit graphics to generate pixel data of pixel position inside said unit graphics;

a storage circuit having a plurality of storage areas able to be simultaneously written with said R, G, B data of a plurality of said pixel data and storing display data including said R, G, B data of a plurality of said pixel data;

a plurality of address generation circuits provided corresponding to the plurality of said pixel data to be simultaneously written to said storage areas and each generating a write address as an address in the storage areas of said storage circuit for being written with said R, G, B data of said corresponding pixel data; and a write circuit for writing said R, G, B data of a plurality of said pixel data to said write addresses in said storage areas; wherein said polygon rendering data generation circuit generates said polygon rendering data further including x, y data indicating two-dimensional coordinates of vertexes for the vertexes of said unit graphics; and said address generation circuit comprises:

a multiplying circuit for multiplying said y-data with width data corresponding to a width of said storage area in an x-direction and an adding circuit for adding only said x-data and a the multiplied result of said multiplying circuit to generate said write address.

10. An image data processing apparatus as set forth in claim 9, wherein:

said polygon rendering data generation circuit generates said polygon rendering data further including z-data indicating a depth for vertexes of said unit graphics; and said address generation circuit comprises:

a first multiplying circuit for multiplying said y-data and width data corresponding to a width of said storage area in the x-direction;

a first adding circuit for adding said x-data, a multiplied result of said first multiplying circuit, and first address data indicating a head address of a predetermined first storage area in said storage area as an area for storing said R, G, B data to generate said write addresses for said r, G, B data;

a second multiplying circuit for multiplying said y-data and said width data; and a second adding circuit for adding said x-data, a multiplied result of said second multiplying circuit, and second address data indicating a head address of a predetermined second storage area in said storage area as an area for storing said z-data to generate a said write address of said z-data.

11. An image data processing apparatus for defining a three-dimensional model by combining a plurality of unit graphics and generating pixel data indicating a color for each pixel arranged in a matrix in a display device, comprising:

a polygon rendering data generation circuit for generating polygon rendering data including R (red), G (green), and B (blue) data of each vertex for vertexes of said unit graphics;

a data interpolation circuit for interpolating the polygon rendering data of vertexes of said unit graphics to generate first pixel data of pixel positions inside said unit graphics;

a storage circuit having a plurality of storage areas able to be simultaneously written with plurality of said first pixel data and storing display data including a plurality of first pixel data;

pixel data generation circuits provided, one for each of said simultaneously written plurality of said first pixel data and each performing color blending using second pixel data and third pixel data for blending a color indicated by said second pixel data and a color indicated by third pixel data stored in a write address by a predetermined blending ratio to generate a new color so as to generate said first pixel data indicating said new color; and a write circuit for simultaneously writing a plurality of said generated first pixel data to the storage areas of said storage circuit; wherein said pixel data generation circuit comprises;

a subtracting circuit for subtraction using said corresponding color data of said first pixel data and said corresponding color data of said third pixel data and a multiplying circuit for multiplying a subtracted result of said subtracting circuit with blending ratio data indicating said blending ratio.

12. An image data processing apparatus as set forth in claim 11, wherein:

said first pixel data, said second pixel data, and said third pixel data include a plurality of colors and indicate a color by combining values indicated by the plurality of color data; and said pixel data generation circuit comprises a plurality of color data generation circuits provided corresponding to a plurality of said color data and each performing color blending using said corresponding color data of said second pixel data and said third pixel data for blending a color indicated by said corresponding color data of said corresponding first pixel data and a color indicated by said corresponding color data of the third data stored at said write address by a predetermined blending ratio to generate a new color so as to generate said corresponding color data of said second pixel data indicating said new color.

* * * * *

UNITED STATES PATENT AND TRADEMARK OFFICE
CERTIFICATE OF CORRECTION

PATENT NO. : 6,727,905 B1
DATED : April 27, 2004
INVENTOR(S) : Atsushi Narita

It is certified that error appears in the above-identified patent and that said Letters Patent is hereby corrected as shown below:

Column 5,
Line 55, delete "Indexes" and insert -- indexes --.

Column 7,
Line 23, after "have" delete "a".
Line 43, after "while" insert -- it --.

Column 8,
Line 8, delete "Indicated" and insert -- indicated --.

Column 10,
Line 60, delete "147a" and insert -- 147c --.

Column 12,
Line 55, delete "input a" and insert -- input $\alpha$ -- (proportional to symbol).

Column 14,
Line 41, delete "Is" and insert -- is --.

Column 16,
Line 27, delete "eta." and insert -- etc. --.
Line 63, delete "the a data" and insert -- the $\alpha$ data -- (proportional to symbol).

Column 17,
Line 3, delete "the input a data" and insert -- the input $\alpha$ data -- (proportional to symbol).

Column 21,
Line 7, delete "a".

UNITED STATES PATENT AND TRADEMARK OFFICE
CERTIFICATE OF CORRECTION

PATENT NO.    : 6,727,905 B1
DATED         : April 27, 2004
INVENTOR(S)   : Atsushi Narita It is certified that error appears in the above-identified patent and that said Letters Patent is hereby corrected as shown below:

<u>Column 21 (cont'd),</u>
Line 25, delete "r" and insert -- R --.

Signed and Sealed this

Second Day of November, 2004

JON W. DUDAS
*Director of the United States Patent and Trademark Office*